United States Patent [19]

Lewis

[11] Patent Number: 4,705,017

[45] Date of Patent: Nov. 10, 1987

[54] STRESS RESISTANT ABRASIVE CUTTING WHEEL

[75] Inventor: Roger L. Lewis, Leawood, Kans.

[73] Assignee: Federal-Mogul Corporation, Southfield, Mich.

[21] Appl. No.: 842,715

[22] Filed: Mar. 19, 1986

Related U.S. Application Data

[63] Continuation-in-part of Ser. No. 766,998, Aug. 19, 1985, abandoned.

[51] Int. Cl.$^4$ ............................................. B28D 1/04
[52] U.S. Cl. .................................... 125/15; 51/206 R
[58] Field of Search .................... 125/12, 13, 14, 15; 51/206 R, 209 R

[56] References Cited

U.S. PATENT DOCUMENTS

| | | | |
|---|---|---|---|
| 1,156,166 | 10/1915 | Meyers | 125/15 |
| 1,614,225 | 1/1927 | Bath | 51/206 P |
| 2,502,043 | 3/1950 | Howard | 125/14 |
| 3,128,755 | 4/1964 | Benson | 51/206 R |
| 4,067,311 | 1/1978 | Benetello | 125/15 |
| 4,345,579 | 8/1982 | Eichenlaub | 125/15 |

FOREIGN PATENT DOCUMENTS

| | | | |
|---|---|---|---|
| 266235 | 2/1927 | United Kingdom | 125/15 |
| 403159 | 12/1933 | United Kingdom | 51/206 P |

OTHER PUBLICATIONS

Blueprint entitled "Segmental Blade Core Wide Slot and Wall Saw" Published by Vanguard Abrasives, Le Roy, New York—1982.

*Primary Examiner*—Harold D. Whitehead
*Attorney, Agent, or Firm*—Lawrence J. Shurupoff; Robert F. Hess

[57] ABSTRACT

An industrial masonry wall saw blade is optimized for minimizing stress adjacent the blade gullets by maintaining the radius of curvature of the arcuate gullets within a fixed range. By further maintaining the total gullet area within preset limits, vibration, noise and blade flexure are also significantly reduced. This is achieved by fixing the radial height of the blade cutting elements within another predetermined range.

11 Claims, 4 Drawing Figures

STRESS RESISTANT ABRASIVE CUTTING WHEEL

CROSS REFERENCE TO RELATED APPLICATIONS

This application is a continuation-in-part of application Ser. No. 766,998, filed Aug. 19, 1985 and now abandoned.

Reference is made to the copending patent application of Paul B. Ballenger, Ser. No. 646,041 filed on Aug. 30, 1984 and to the copending patent application of Carl F. Roemmele and Joseph D. Ekland, Ser. No. 510,439, filed on July 6, 1983, and now U.S. Pat. No. 4,550,708, issued Dec. 5, 1985 each assigned to the same assignee as the assignee of the present application. The disclosures of these copending applications, Ser. Nos. 646,041 and 510,439 are incorporated by reference herein.

BACKGROUND OF THE INVENTION

1. Field Of The Invention

The present invention relates to abrasive saw blades or cutting wheels and specifically to industrial saw blades of the type formed by a circular sheet metal drive core having one or more cutting members containing dispersed diamond dust secured around the drive core periphery.

2. Description Of Prior Developments

Attention has recently turned to a new type of industrial saw blade referred to as the discontinous rim or segmented type blade. This cutting disc is made by mounting to a circular core a series of short arcuate cutting segments containing diamond powder dispersed in a metallic matrix. These cutting segments are usually about 2 inches long and are ordinarily silver soldered, brazed or welded to the rim of a steel core which has been divided into a plurality of support sections having peripheral surfaces for supporting the segments. These support sections are separated by radially extending gullets which accommodate the large thermal stresses created in the disc by the frictional heating of its periphery during cutting operations. Segmented blades have been accepted by those industries that subject the blades to heavy-duty use, such as the concrete sawing and masonry cutting industries where rough abrasive cutting is commonplace.

For such rigorous applications it is common to flush the cutting area continuously during the cutting operation with a fluid coolant in order to keep the blade as cool as possible. The coolant also serves to flush loose rock-like material, spent abrasive and the like from the cutting site, all of which in combination with the coolant itself is generally referred to in the art and throughout this description of the present invention as "swarf". Even though construction of this type of blade has been developed to a high point of perfection, blades must commonly be replaced whenever the swarf erodes the steel drive core at the juncture of the cutting members with the core.

In addition to blade erosion, conventional segmented blades are also prone to core cracking. This cracking usually begins at a point adjacent the bottom of one gullet and spreads radially inwardly until it meets another crack extending radially inwardly from an adjacent gullet. At this point an extremely dangerous condition develops whereby a generally triangular shaped blade section may break loose from the rotating core.

Another drawback experienced with conventional segmented blades is the generation of excessive vibration. This vibration is frequently accompanied by high operating noise levels. Some blades have produced noise levels up to 140 db at a distance of 6 feet from the blade. At these levels serious hearing damage is possible. Another undesirable condition which accompanies blade vibration is a bucking or jerking of the blade away from its cutting surface. This reduces the cutting rate, extends cutting time and is extremely annoying to the operator of the saw.

Prior to the invention of the related applications referred to above, little or no thought had been given to utilize blade construction per se to more effectively cool the blade core, to more effectively deliver coolant to the immediate area or point at which the wheel is making the cut and to flush away the swarf. While these prior blades generally performed satisfactorily, their optimization was not fully realized as it was not possible to specifically identify the mechanism by which their improved performance was achieved, although the large volumetric capacity of the gullets was hypothesized as being responsible.

Through extensive testing it has presently been determined that volumetric capacity is only one of at least two factors which contribute to improved blade performance. It is this second factor to which the present invention is primarily directed.

Accordingly, a need exists for a segmented cutting blade which resists core erosion, minimizes core stresses and core cracking, reduces blade vibration and minimizes cutting noises.

SUMMARY OF THE INVENTION

The present invention is directed to a circular segmented cutting wheel having a plurality of diamond-bearing arcuately shaped cutting segments bonded to the periphery of the wheel. A special dimensioned U-shaped gullet is formed between each pair of adjacent cutting segments. The radial height of each cutting segment is maintained within a predetermined range and the radius of curvature of each gullet formed within the blade core is also maintained within a predetermined range. These ranges limit the gullet area between relatively critical upper and lower limits. It is gullet area which has been found to be a major factor in achieving optimum blade performance. In fact, gullet area is now believed to be of primary blade design significance.

The upper limit on area should not be exceeded since excessively large gullet areas have been found to cause high stresses within the core and cause core cracking. Moreover, excessively large gullet areas have been found to cause severe core flexure and vibration. This in turn generates high operating noise levels and other undesirable thereat as will be discussed further below.

The lower limit on area should not be exceeded in order to ensure an adequate removal of swarf. If the gullet area is too small, the blade will not remove sufficient swarf from the cutting area, thereby leaving an abrasive slurry surrounding the cutting site and covering the substrate being cut. This slurry hinders the cutting segments from engaging the cutting surface so that the cutting segments are forced to recut the swarf particles instead of the substrate. This condition causes accelerated blade wear and impedes the cutting rate so that cutting time is increased.

Accordingly, an object of the invention is to construct a cutting wheel in such manner so as to effectively circulate a fluid coolant and efficiently remove swarf from the cutting site.

Still another object of the invention is to provide a cutting wheel which reduces cutting noise.

A further object is to provide a cutting wheel which prevents blade core cracking by minimizing operating stresses adjacent the blade gullets.

Another object of the invention is to provide a cutting wheel having a sufficiently large area for effectively removing swarf from the surface area being cut, yet having a sufficiently small area for preventing excessive blade flexure.

The realization of these objects and various other objects, features and attendant advantages of the present invention will be more fully appreciated from the following detailed description when considered in connection with the accompanying drawings, in which the same reference numbers designate the same or corresponding parts throughout.

DETAILED DESCRIPTION OF THE PREFERRED EMBODIMENTS

The present invention is preferably structured similarly to that blade described in the above-referenced Roemmele et al application, except for several critically different aspects concerning the relative dimensions of the support segments, the gullets and the cutting elements. In order to fully appreciate the refinements of the present invention, the blade of Roemmele et al will first be discussed.

Figure 1:
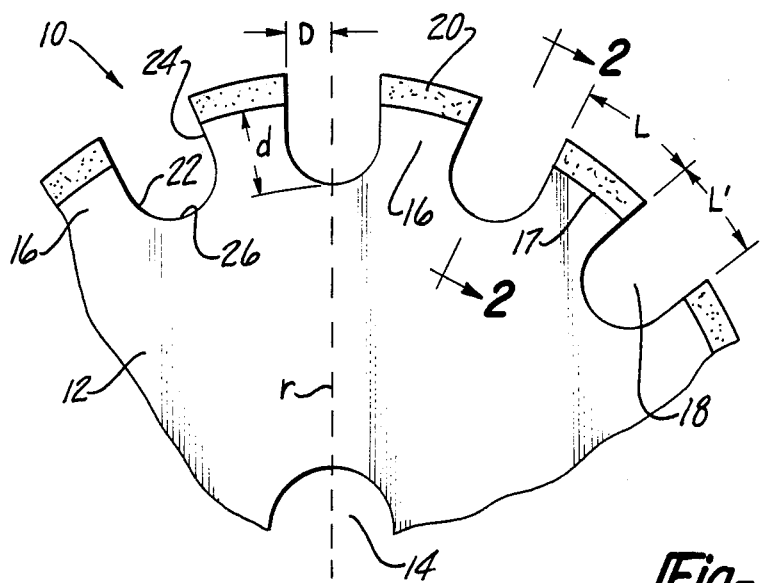
FIG. 1, which is a fragmentary face view of a cutting wheel according to one example of the prior art.
Figure 2:
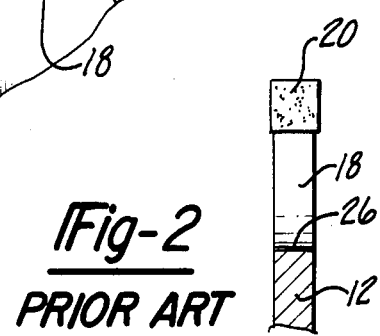
FIG. 2, which is a fragmentary radial cross section of the cutting wheel of FIG. 1 taken approximately on the line 2—2 thereof through a gullet.

FIGS. 1 and 2 illustrate an exemplary embodiment of a diamond abrasive blade or cutting wheel according to the Roemmele et al application. The cutting wheel 10 generally includes a central sheet metal drive disk or blade core 12 made of suitable wrought metal, preferably steel. The core is formed with a central apparatus or arbor hole 14 for mounting the blade on a rotating axially-extending shaft.

The periphery of the core is segmented so as to provide a plurality of support segments 16 and a gullet 18 between each adjacent pair of support segments. Upon a base or support surface 17 located at the radial extremity of each support segment there is bonded a diamond-bearing cutting element 20. The bases of the support segments along the support surfaces 17 define circular arcs having the center of the drive core as their centers of curvature. As viewed from the face of the saw blade looking in an axial direction, the cutting elements are arcuate.

The cutting elements are composed of any suitable abrasive material such as a diamond grit embedded and dispersed in a hard matrix material composed of, for example, a mixture of bronze and iron. As further seen in FIG. 1, the cutting elements 20 are approximately rectangular in cross section, (as viewed in a circumferential direction), and have a slightly greater width in an axial direction than the core 12 to extend axially outwardly beyond the surfaces of the core 12 by a small equal amount at either side. The diamond bearing cutting elements 20 are wider than the body of the core 12 to provide clearance during cutting, acting similar to the "set" on a wood or metal cutting saw blade.

The gullets shown in FIG. 1 are bounded and defined in part by respective opposed side faces 22 and 24 of each adjacent pair of support segments. Each pair of side faces 22 and 24 forms a generally U-shaped gullet with a semi-circular radiused, or other arcuate, face portion 26 at the closed end of the gullet. The gullet is shown to be symmetrical about a line r radiating from the center of the blade through the gullet such that the distance D between on side face 22 and radial line r is generally equal to the distance between the other side face 24 and the radial line r. The side faces 22 and 24 are generally straight lines that are parallel to the radius line r and hence to each other. Gullet depth d as defined in Roemele et al, is the radial distance between the open and closed ends of the gullet, and is approximately equal to the are length L' of the gullet. This gullet excludes the area between adjacent cutting elements.

The total peripheral or circumferential length of the diamond bearing material, i.e. the total circumferential length of all cutting elements is approximately equal to the total gullet are length or circumferential gullet width at the extremities of the wheel. The cutting element are length L of each cutting member is approximately equal to the arc length L' of each gullet.

Figure 3:
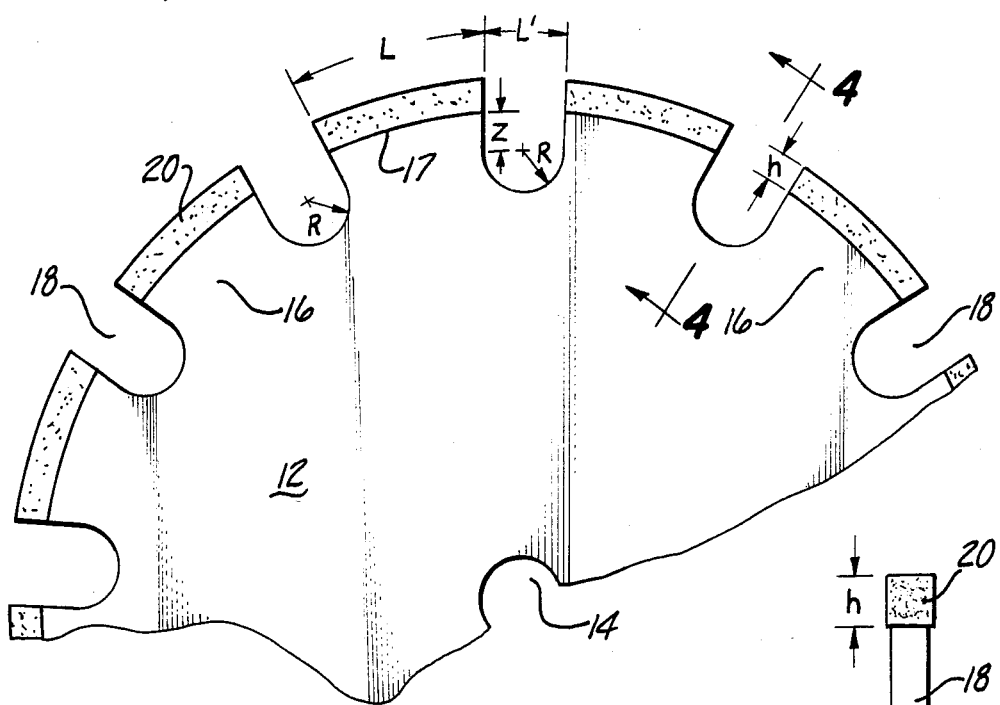
FIG. 3, which is a fragmentary face view of a cutting wheel according to a preferred embodiment of the invention.
Figure 4:
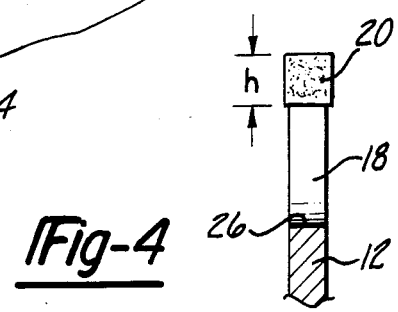
FIG. 4, which is a fragmentary radial cross section of the cutting wheel of FIG. 3 taken approximately on the line 4—4 thereof through a gullet.

The blade structure according to the present invention is shown in FIGS. 3 and 4. The cutting elements are substantially the same as those in FIGS. 1 and 2 as is the general blade core construction. The primary difference between this new blade and that shown in FIGS. 1 and 2 is the basic definition of what constitutes a gullet and the resulting area of the gullet. More particularly, instead of the gullets having an opening L' of approximately the same length as the length L of the cutting elements, the present invention maintains narrower gullet openings so that L' is maintained within a range of 0.3L to 0.7L, (instead of being approximately equal to L). In addition, the total peripheral length of the cutting elements is not necessarily equal to the total gullet are length. In fact, it is generally much greater.

It has been found that the flexure, vibration, core cracking, and cutting segment loss experienced with previous blades was largely attributable to an excessively large gullet opening. Moreover, large gullet openings were also found to be the cause of excessive operating noise. By reducing both the gullet opening and the gullet area, the flexure, vibration, cracking and noise problems previously experienced have been virtually eliminated.

While the preferred cutting segment length L is still maintained at approximately the industry standard of two inches, the gullet width as well as the gullet depth has been decreased.

In order to ensure that the blade operates optimally, several blade parameters must be maintained within predetermined limits. The first parameter to consider is the radius of curvative R which defines a portion of each gullet 18 formed within the blade core 12. The area of each gullet as defined herein extends radially outwardly beyond the blade core periphery by a distance h which is equal to the radial height of each cutting segment.

All areas discussed below have been calculated using the approximation that the total gullet area equals the area of a semicircle having a radius equal to the gullet radius R, plus the area of a rectangle having a base equal to the gullet opening which approximates the value 2R and having a height equal to h. Thus gullet area "A" is approximated by $A = \frac{1}{2}\pi R^2 + 2Rh$. This approximation yields satisfactory results even though the center of the gullet radius may be as much as 0.3 inch radially inwardly of the cutting segment support surface 17. Thus "Z," shown in FIG. 3 may range from 0 to 0.3 inch, although for almost all practical applications, Z approximates 0.05 inch.

Thus, the term "gullet" as used herein is not limited to that area defined between adjacent support segments as is the gullet in Roemmele et al, but further includes that area defined between adjacent cutting elements as well. Through detailed stress around the arcuate inner portion of the gullet where core cracking originates, the radius of gullet curvature R should be as large as possible. However, if R is made too large, several undesirable conditions develop.

More particularly, it has been determined that if R exceeds a value of 0.75 inches, the support segments located between adjacent gullets begin to undergo excessive flexure due to their weakening via material removal. That is, by widening the gullets, the adjacent support segments are necessarily narrowed. A narrow support segment has been found to be prone to flexure which produces at least three undesirable affects. The first affect is the loss of the cutting elements from the support segments as they break away from the blade core when subjected to extreme blade core flexure. This is obviously a dangerous condition and should be avoided at all costs. Moreover, blade performance is adversely affected since the blade's cutting capacity is decreased as fewer cutting segments engage the cutting surface during each rotation. This results in longer cutting times and slower cutting rates.

A second undesirable effect of excessive flexure caused by an oversized gullet is the generation of excessive blade vibration. This vibration adversely affects the blade's ability to track along a desired cutting path. Frequently the excesive vibration will cause the saw to buck, kick back or jump away from its cutting surface. Not only is this an annoying condition, it is also potentially dangerous. Cutting rates are further reduced by this effect.

The third undesirable threat of excessive blade flexure and frequently the most annoying is the generation of extremely high cutting noise levels. Noise levels of up to 140 db have been measured at a distance of only 6 feet from a blade operating with oversized gullets.

Accordingly, by maintaining the radius of curvature R of each gullet below a value of 0.75 inch and further maintaining other blade parameters within fixed ranges, as discussed below, excessive blade flexure may be prevented and the undesirable effects noted above thereby completely avoided.

In addition to maintaining the radius of curvature to a value below 0.75 inch, it has been found necessary to maintain the radius of gullet curvature R to a value above 0.5 inch. If R falls below 0.5 inch insufficient swarf is removed from the cutting site. This causes excessive blade wear and increases cutting time.

Still another blade parameter which must be controlled is cutting element height. The stability of the blade has been found to be related to the depth of the U-shaped gullets which depth includes the value h. More particularly, h must be maintained within the range of 0.050 inch to 0.750 inch. A cutting element of less than 0.05 inch height is impractical since its useful life is negligible and a segment height greater than 0.750 inch generates excessive vibration, noise and stress.

Thus, the combination of gullet radius ranges between 0.5 inch and 0.75 inch and cutting segment height ranges between 0.050 inch and 0.75 inch substantially defines a gullet area range between 0.4 inch$^2$ and 2.0 inch$^2$. This range of gullet areas has been found to yield most satisfactory results by reducing stress, vibration, core cracking and noise. Thus, it is area which has been determined to be a major controlling factor in blade performance and through extensive testing, this particular area range has been found to provide satisfactory blade performance.

Within the gullet area range of 0.4 in$^2$ to 2.0 in$^2$ set forth above is a preferred operating range of 0.6 in$^2$ to 1.6 in$^2$. This area is defined by a U-shaped gullet having a gullet radius ranging from 0.5 inch to 0.75 inch, the total radius range mentioned above, but combined with a cutting element height range limited between 0.2 inch and 0.5 inch. In fact, this cutting element height range can be further refined to an optimal range of 0.25 inch to 0.375 inch thereby resulting in an optimum gullet area range of about 0.5 in$^2$ to 1.4 in$^2$.

The actual gullet area used in practice may be in part influenced by the diameter of the blade core. Generally, as the diameter of the blade core increases, the minimum area of the gullet is increased. More particularly, blade cores with diameters of less than 36 inches are preferably formed with gullets having areas ranging approximately from 0.5 in$^2$ to 2.0 in$^2$; blade cores having diameters of 36 inches through 42 inches are preferably formed with gullets having areas ranging from approximately 0.7 in$^2$ to 2.0 in$^2$; and blade cores having diameters greater than 42 inches are preferably formed with gullets having areas ranging approximately from 1.0 in$^2$ to 2.0 in$^2$. A gullet area which has been found to provide most satisfactory performance for all blade cores of the type described above, regardless of blade core diameter, ranges from approximately 1.1 in$^2$ to 1.2 in$^2$.

While the gullets shown in FIG. 3 are formed in the same way and have the same general U-shape as the gullets shown in FIG. 1, any arcuate shaped gullet is intended to come within the scope of the invention, including irregularly shaped and/or asymmetrically shaped gullets.

Obviously, numerous modifications and variations of the present invention are possible in light of the above teachings. It is therefore to be understood that within the scope of the appended claims, the invention may be practiced otherwise than as specifically described herein.

What is claimed is:

1. A rotatable cutting wheel for cutting rock or rock-like material, said cutting wheel comprising:
   a circular generally disc-shaped drive core having a plurality of circumferentially extending and circumferentially-spaced support surfaces, each of said support surfaces having affixed thereto an abrasive cutting element capable of cutting an abradable rock or rock-like material, said cutting element having a predetermined radial height;

said core having a plurality of gullets, each of said gullets having opposed faces and each one of said gullets being located between said opposed faces and between each adjacent pair of cutting elements, each one of said gullets extending between a closed gullet end located radially inwardly of said cutting element and an open gullet end being in communication with a space between said adjacent pair of said cutting elements; and at least several of said plurality of gullets having a width defined between said opposed faces within a range of 1.0 inch to 1.5 inch and wherein several of said plurality of gullets have an area defined between said opposed faces and between said adjacent pair of cutting elements within an area range of 1.0 in$^2$ to 2.0 in$^2$.

2. The cutting wheel of claim 1, wherein each one of said plurality of gullets has an area defined between said opposed faces and between said cutting elements within an area range of 1.1 in$^2$ to 1.2 in$^2$.

3. The cutting wheel of claim 1, wherein each one of said gullets comprises a substantially U-shaped gullet having a radius of curvature within the range from 0.5 inch to 0.75 inch.

4. The cutting wheel of claim 3, wherein said predetermined height of said cutting element is within a range between 0.25 inch and 0.375 inch.

5. The cutting wheel of claim 1, wherein said area range is further limited to a range of 1.0 in$^2$ to 1.4 in$^2$.

6. The cutting wheel of claim 5, wherein said predetermined height of said cutting element is within a range between 0.25 inch and 0.375 inch.

7. A rotatable cutting wheel for cutting rock or rock-like material, said cutting wheel comprising:
a circular generally disc-shaped drive core having affixed thereto a plurality of abrasive cutting elements capable of cutting an abradable rock or rock-like material;

said core having a plurality of gullets having opposed faces, each one of said gullets extending between a closed gullet end located radially inwardly of said cutting elements and an open gullet end being in communication with a space between an adjacent pair of said cutting elements; and at least several of said plurality of gullets having an area defined between said opposed faces and between said adjacent pair of cutting elements within an area range of 1.0 in$^2$ to 2.0 in$^2$.

8. The cutting wheel of claim 7 wherein each one of said plurality of gullets has said area further defined within an area range of 1.1 in$^2$ to 1.2 in$^2$.

9. The cutting wheel of claim 7, wherein each one of said gullets comprises a substantially U-shaped gullet having a radius of curvatue within the range from 0.5 inch to 0.75 inch.

10. The cutting wheel of claim 9, wherein said predetermined height of said cutting element is within a range between 0.25 inch and 0.375 inch.

11. The cutting wheel of claim 7, wherein said area range is further limited to a range of 1.0 in$^2$ to 1.4 in$^2$.

* * * * *

UNITED STATES PATENT AND TRADEMARK OFFICE
CERTIFICATE OF CORRECTION

PATENT NO. : 4,705,017

DATED : November 10, 1987

INVENTOR(S) : Roger L. Lewis

It is certified that error appears in the above-identified patent and that said Letters Patent is hereby corrected as shown below:

Column 2, line 57, "thereat" should read "effects".

Column 4, line 19, "on" should read "one".

Column 4, line 26, "are" should read "arc".

Column 4, line 31, "are" should read "arc".

Column 4, line 33, "are"should read "arc".

Column 4, line 48, "are" should read "arc".

Column 5, line 21, after "stress" and before "around" should read "analysis it has been determined that in order to minimize stress".

Column 5, line 52, "thereat" should read "effect".

Column 7, line 2 (Claim 1), "oneof" should read "one of ".

Signed and Sealed this

Second Day of August, 1988

Attest:

DONALD J. QUIGG

*Attesting Officer*          *Commissioner of Patents and Trademarks*